United States Patent [19]
Groeblacher et al.

[11] Patent Number: 5,198,242
[45] Date of Patent: Mar. 30, 1993

[54] ROTARY TURRET EMBOSSER

[75] Inventors: Hans Groeblacher; Horst Eigruber; Ludwig Reisinger, all of McPherson, Kans.

[73] Assignee: American Maplan Corporation, McPherson, Kans.

[21] Appl. No.: 805,862

[22] Filed: Dec. 10, 1991

[51] Int. Cl.⁵ .............................................. B29C 59/04
[52] U.S. Cl. ................................. 425/150; 264/40.7; 264/284; 425/161; 425/183; 425/185; 425/194; 425/367; 425/384; 425/385
[58] Field of Search ............... 264/162, 40.7, 284; 425/385, 183, 185, 194, 363, 367, 388, 150, 161, 384, 8

[56] References Cited

U.S. PATENT DOCUMENTS

| | | | |
|---|---|---|---|
| 3,348,264 | 10/1967 | Rice et al. | 425/385 |
| 3,387,330 | 6/1968 | Lemelson | 425/385 |
| 3,776,681 | 12/1973 | Neil | 425/385 |
| 4,218,204 | 8/1980 | Edwards | 425/185 |
| 4,486,377 | 12/1984 | Lucchesi et al. | 425/385 |
| 4,695,239 | 9/1987 | Klepsch et al. | 425/194 |
| 4,714,420 | 12/1987 | Milisavljevic | 425/185 |
| 5,006,056 | 4/1991 | Mainstone et al. | 425/194 |
| 5,024,719 | 6/1991 | Heck et al. | 425/385 |

Primary Examiner—Jay H. Woo
Assistant Examiner—Khanh P. Nguyen
Attorney, Agent, or Firm—Herbert Dubno

[57] ABSTRACT

An embossing apparatus in an extrusion line for the production of sheet extrusions like vinyl siding, can include a revolver above the backing roll and supported in a pair of cradles so that selected embossing rolls can be juxtaposed with the backing roll and can define the embossing gap therewith. The revolver is indexed in position by pneumatically-operated locking members on the cradles. The revolver allows embossing roll change on the fly, if desired.

12 Claims, 3 Drawing Sheets

ROTARY TURRET EMBOSSER

FIELD OF THE INVENTION

Our present invention relates to a rotary turret embosser and, more particularly, to an embosser for thermoplastic extrusions emerging from an extruder and especially for extruding vinyl siding.

BACKGROUND OF THE INVENTION

In the production of extruded materials from synthetic resins or plastics, especially thermoplastic extrusions like vinyl siding composed of polyvinyl chloride, it is common to emboss a pattern on the extruded material.

Consequently, a typical sheet extrusion line as may be used for the production of polyvinyl chloride siding can include an extruder provided with a sheet die capable of extruding as a continuous strand, a hot body or extrusion which is then passed through an embosser before it enters a calibration system and is engaged by a hauler, haul-off or take-off device which draws the extrusion through the calibration and cooling unit.

The embossing unit can include an embossing roller juxtaposed with a backing roller and forming with the backing roller a gap through which the extrusion is passed.

The embossing and backing rollers may be chilled by the circulation of a chilling fluid through them.

In addition, along the extrusion line, the pliable and plastically deformable extrusion may pass around or into contact with one or more chill rollers which also are chilled by the circulation of a liquid through them.

The calibration and sizing unit may comprise one or more calibrators or sizers, referred to as vacuum calibrators or sizers and in which the extrusion is drawn by suction against a calibrating or sizing surface imparting nuances in shape or size to the extruded product.

The calibration table may include a cooling bath or other means for subjecting the extrusion to a cooling fluid whereby the extrusion is rigidified.

Along the line, especially for the production of vinyl siding, any necessary slot and punching devices can be provided and a cutter can be located along the line for subdividing the continuous extrusion into lengths.

In the case of vinyl siding as well, it is possible to provide box-erecting means for forming cartons or the like in which the siding is to be shipped, and means for introducing predetermined numbers of the lengths of siding which are produced into the cartons or boxes thus provided.

The hauler or haul-off device may be a tractor-type hauler in which a pair of endless tracks engages the extrusion between them.

In systems of the aforedescribed type, the rotary embossing unit provides an embossed or textured surface on the extruded product and one or both of the embossing rollers can be driven, e.g. by a motor. The upper roller surface is usually made of steel and carries a reverse of the pattern to be transferred to the plastic extrusion. This upper roller is pressed against the plastic extrusion which are supported by the backing roller.

A rotary embosser should maintain uniform pressure between the cylinders or rolls to control the embossing depth, must operate at a speed which matches the line speed of the extruded sheet, and generally must have its rolls chilled or cooled by the circulation of, for example, chilled water therethrough.

In the past, it has been found to be necessary to change the pattern of the embossed product fairly frequently and, using current technology, this changeover has required between one-half hour and three hours to remove at least the embossing roll, mount a new embossing roll in place and connect up the various liquid fittings which may be required.

The interruption in the line which this changeover requires has, in the past, necessitated the purging of the extruder in the case of polyvinyl chloride siding production. In addition to the down time, there is a loss of material amounting typically to 500 to 1400 pounds, in addition to the loss in output.

Clearly the conventional apparatus which requires such substantial changeover time is a severe economical and technological problem.

OBJECTS OF THE INVENTION

It is the principal object of our present invention to provide an improved embossing apparatus for an extrusion line of the type described, especially for extruded sheet material and most specifically for the production of polyvinyl chloride siding, whereby the disadvantages of the earlier systems can be avoided.

Another object of this invention is to provide an embossing apparatus for vinyl siding or like extruded plastic sheet material which will significantly reduce the down time of the extrusion line during embossing roll changeover, will minimize the amount of material waste, and will significantly diminish the loss in output from such a line.

Still another object of our invention is to provide an embossing apparatus for the purposes described which will afford rapid changeover of the embossing surface and, possibly, even allow changeover on the fly, i.e. without shutdown of the extrusion line at all.

SUMMARY OF THE INVENTION

These objects and others which will become apparent hereinafter are attained, in accordance with the invention, in an embossing apparatus which can be provided in a extrusion line of the type described between a sheet extruder and a calibrator unit upstream of a hauler, the embossing apparatus comprising a lower backing roll and a turret rotatable about a horizontal axis and formed with angularly-spaced embossing rolls mounted to be swung by rotation of the turret selectively into juxtaposition with the backing roll.

According to the invention, means is provided on the mounting structure for the turret and on the turret for indexing and locking each embossing roll in position opposite the backing roll.

According to a feature of the invention, the turret or revolver, which can carry two to five nondriven embossing rolls, can be locked or indexed in the angular position at which a selected embossing roll is rendered operative by an air-sized mechanical interlock, for example, a pneumatically-operated latching pin. The backing roll can be moved into its operating position by an air-over hydraulic system and the turret or revolver may be provided with a rotary chilling liquid distributor connected to the individual rollers for circulating the chilling water therethrough. A valve system can be provided for controlling the flow through the individual rollers and the central rotary union or distributor.

According to a feature of the invention, each of the embossing rolls is journaled between a pair of end plates of the turret or revolver, the end plates riding on support rollers of a cradle which can be mounted upon a base.

The backing roll can be raised and lowered in a guide formed on the base by, for example, hydraulic cylinders and means can be provided for shifting guides for the backing roll for precise alignment of the backing roll with the embossing roll locked in position when the turret is indexed.

More specifically, the embossing apparatus of the invention can comprise:
- a base;
- a backing roll mounted on the base for rotation about a substantially horizontal backing-roll axis;
- means on the base operatively connected with the backing roll for driving same;
- a revolver mounted on the base above the backing roll and rotatable about a substantially horizontal revolver axis, the revolver comprising:
    - a rotatable support, and
    - a plurality of embossing rolls angularly spaced on the support about the revolver axis and journaled in the support for rotation about respective embossing-roll axes; and
- indexing means on the base and the support for indexing the embossing rolls selectively in positions wherein the embossing rolls are individually positioned above the backing roll to emboss an extrusion advanced through a gap between the backing roll and a selected embossing roll positioned thereabove by rotation of the backing roll.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
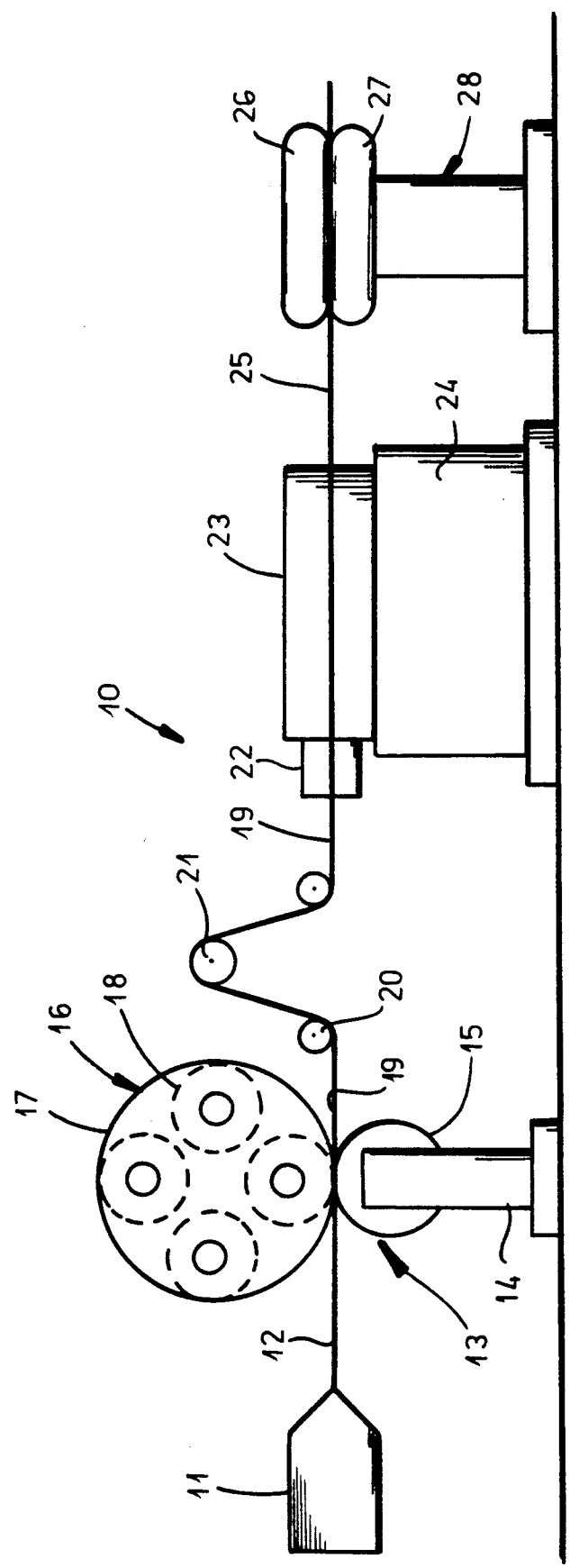
FIG. 1 is a diagram representing generally in side elevational view the essential components of an extrusion line for the production of embossed extruded sheet material, for example, polyvinyl chloride siding.

Referring to FIG. 1, it can be seen that a line 10 for producing vinyl siding can comprise a sheet extrusion die 11 from which a hot plastically-deformed extrusion 12 emerges, is provided upstream of an embossing apparatus 13 which, as will be described in greater detail with respect to FIGS. 2 and 3, can comprise a base 14, a lower backing roll 15 and a revolver 16 above the lower backing roll and provided with a support 17 on which the individual embossing rolls 18 are journaled for selective positioning opposite the backing roll 15.

The embossed extrusion 19 is passed around chilling rolls 20 and 21 and then into a vacuum sizer 22 upstream of a cooling tank 23 on a calibrator table represented generally at 24. The substantially rigid extrusion 25, in the form of a continuous strand of the vinyl siding, is engaged between the tracks 26 and 27 of a haul-off or haul unit 28 pulling the extrusion through the calibrator table and delivering it to a cutter and packaging equipment as described above.

As can be seen from FIGS. 2 and 3, the embossing unit can comprise a base 30 mounted on rollers 31 displaceable on a track 32 and comprising a housing 33 receiving an air-over hydraulic unit 34 and a manifold 35 having valves 36 for delivering chilled water to the various rollers which are to be chilled and to the embossing and backing rolls as will be described in greater detail.

The housing 33 can include a refrigerating unit for chilling the water, the pumps for recirculating the water and a compressor for generating the compressed air operating the pneumatic parts of the apparatus such as the air-over hydraulic unit 34 and the pneumatically actuated indexing device also to be described.

The backing roller 40 has a shaft 41 journaled in bearing assemblies 42 and 43 mounted in vertically slidable members 44 and 45 which can be raised and lowered on a platform 46 by respective hydraulic cylinders 47 and 48 for adjusting the width of the gap G between the backing roll 40 and a embossing roll disposed thereabove. The platform 46 is shiftable in two mutually perpendicular horizontal directions by leading screw arrangements represented at 50 and 51 to properly orient the backing roll and the embossing roll disposed thereabove.

The backing roll 40 is provided with inlet and outlet fittings 52 and 53 for the circulation of the chilled water therethrough, the inlet fitting 52 being connected via one of the valves 36 to the manifold 35. An outlet manifold can receive the water from outlet 53 to return it to the chilling unit within the housing 33. In the description therein, it will be understood that all chilled rollers and rolls have such return air outlet fittings connected to the outlet manifold, not shown, so that these may not be described further herein.

The uprights 55 and 56 carry cradles 57 and 58 formed between plates 59 and 60, for example, and comprised of rollers 61 which carry the disks 62 and 63 of a support 64 of a revolver or turret.

The plates 60 on opposite sides of the rolls are interconnected by bars 65.

The revolver support also comprises a pair of rigid angles 66 connected to the opposite disks by flanges 67 so that the disks and the angle 66 form a rigid unit on which a plurality of embossing rolls 70, 71, 72 and 73 are mounted. While four such embossing rolls which can have the same or different diameters and the same or different embossing patterns have been illustrated, in practice there may be up to ten such rolls angularly spaced about the axis of the revolver and preferably up to five such embossing rolls.

Each embossing roll is journaled on the disks 62 and 63 in a respective bearing assembly 75, 76, shown for the roller 70 and is provided with fittings 77 and 78 for the circulation of chilled water therethrough. The axis of the revolver is represented at 80 and is shown to be provided with a central rotary union manifold 81 supplied with the chilled water through one of the valves 36 and distributing the chilled water, in turn, to the inlet fittings 77, etc. of the respective embossing rollers 70–73. A similar rotary union manifold can be provided to return the water from the outlet fittings to the chilling union.

Figure 2:
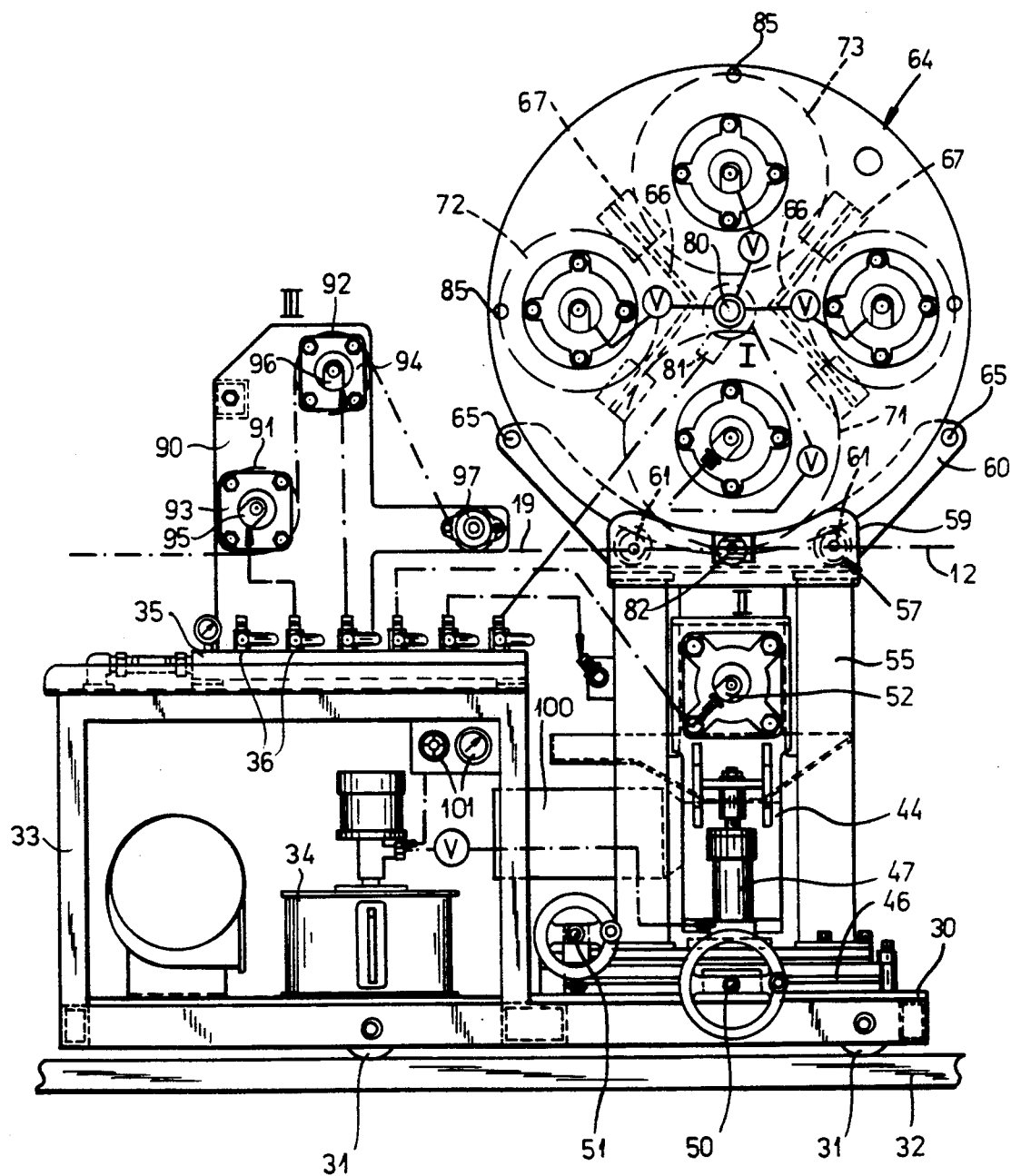
FIG. 2 is a side elevational view of an embossing unit which can be used in this line.
Figure 3:
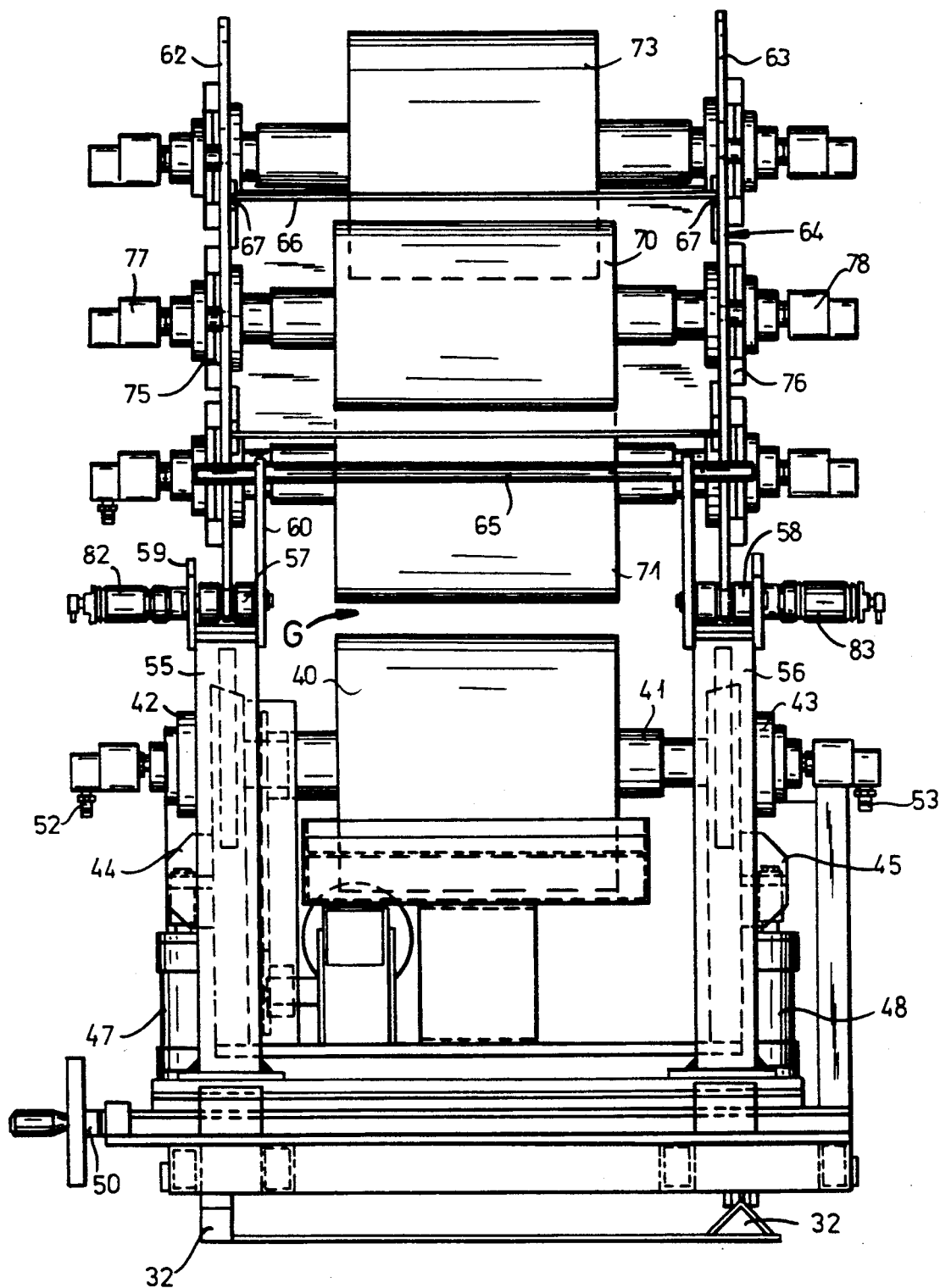
FIG. 3 is a front view of this embossing unit.

As can be seen from FIGS. 2 and 3, moreover, the revolver 64 etc. can be rotated to align any selected embossing roll 70–73 with the backing roll 40 to define the gap G therewith, the revolver being indexed in position by pins of pneumatic cylinder arrangements 82 and 83 mounted on the cradles 57 and 58, respectively, and engaging in respective indexing holes of the plates 62 and 63. These holes can be seen at 85 in FIG. 2 for the three embossing rolls which are not in working position.

The embossing apparatus can also have uprights as shown at 90 on which chilling rolls 91 and 92 are journaled in bearings 93 and 94, for example, the chilling rolls having fittings 95 and 96 connected to respective valves 36 for circulating chilling liquid therethrough. An idler roll 97 can also be mounted on the uprights 90.

It will be apparent from FIGS. 2 and 3, therefore, that the retraction of the pins from the holes 85 of the working roll 71 in the embossing position will allow the revolver to rotate while the extrusion 12, 19 continues to pass through the embossing unit to allow a new embossing roll to be positioned opposite the backing roll 40 and locked in place by the indexing units 82 and 83. The backing roll 40 can be moved to its operating position using the air-over hydraulic system 34 and the cylinders 47 and 48 and is driven by an electric motor 100 mounted on the base. The embossing roll in the operating position is driven indirectly. A pressure-regulating valve shown only diagrammatically at 101 may be used to control the embossing depth by controlling the pressure supplied by the air-over hydraulic unit 34.

We claim:
1. In an extrusion line for producing a sheet extrusion of a plastic material, an embossing apparatus comprising:
   a base;
   a backing roll mounted on said base for rotation about a substantially horizontal backing-roll axis;
   means on said base operatively connected with said backing roll for driving said backing roll;
   a revolver mounted on said base above said backing roll and rotatable about a substantially horizontal revolver axis, said revolver comprising:
      a rotatable support, and
      a plurality of embossing rolls angularly spaced on said support about said revolver axis and journaled in said support for rotation about respective embossing-roll axes; and
   indexing means on said base and said support for indexing said embossing rolls selectively in positions wherein said embossing rolls are individually positioned above said backing roll to emboss an extrusion advanced through a gap between the backing roll and a selected embossing roll positioned thereabove by rotation of said backing roll.

2. The apparatus defined in claim 1 wherein two to ten embossing rolls are provided on said revolver.

3. The apparatus defined in claim 2 wherein two to five embossing rolls are provided on said revolver.

4. The apparatus defined in claim 1 wherein the embossing rolls on said revolver are of different diameters.

5. The apparatus defined in claim 1 wherein said indexing means includes a fluid-operated lock engageable with said support for positioning and locking said revolver in each position wherein a respective one of said embossing rolls is juxtaposed with said backing roll.

6. The apparatus defined in claim 1, further comprising means for feeding a chilling liquid to the embossing roll positioned above said backing roll.

7. The apparatus defined in claim 6 wherein said means for feeding includes a central rotary union manifold for distributing the chilling liquid to the individual embossing rolls.

8. The apparatus defined in claim 1 wherein said line is constructed and arranged to produce embossed polyvinylchloride siding.

9. The apparatus defined in claim 1, further comprising means on said base for shifting said backing roll horizontally in two mutually perpendicular directions and hydraulic means for raising and lowering said backing roll.

10. The apparatus defined in claim 9 wherein said base is formed with a pair of cradles, said support comprising a pair of disks, each of said disks being received on a respective one of said cradles, and said support further comprising rigid members connecting said disks, said embossing rolls being journaled on said disks.

11. The apparatus defined in claim 10, further comprising a plurality of chilling rolls on said base, said extrusion passing around said chilling rolls, said chilling rolls being provided with means for circulating a chilling liquid through said chilling rolls.

12. The apparatus defined in claim 11 wherein said extrusion line includes a vinyl siding die upstream of said gap for producing said extrusion in the form of a continuous strand of vinyl siding, said chilling rolls downstream of said gap, a vacuum calibrator table downstream of said chilling rolls, a cooling unit downstream of said calibrator table, and a hauler engageable with said extrusion downstream of said calibrator for drawing said extrusion through said calibrator.

* * * * *